(12) United States Patent
Ushiroda et al.

(10) Patent No.: US 9,151,362 B2
(45) Date of Patent: Oct. 6, 2015

(54) TRANSMISSION

(75) Inventors: Yuichi Ushiroda, Okazaki (JP); Takuya Yamamura, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 14/129,013

(22) PCT Filed: May 29, 2012

(86) PCT No.: PCT/JP2012/063746
§ 371 (c)(1),
(2), (4) Date: Dec. 23, 2013

(87) PCT Pub. No.: WO2013/008545
PCT Pub. Date: Jan. 17, 2013

(65) Prior Publication Data
US 2014/0116169 A1    May 1, 2014

(30) Foreign Application Priority Data

Jul. 8, 2011 (JP) ................................. 2011-151891

(51) Int. Cl.
*F16H 3/091* (2006.01)
*F16H 3/087* (2006.01)
*B60K 6/48* (2007.10)
*F16H 3/00* (2006.01)

(52) U.S. Cl.
CPC *F16H 3/087* (2013.01); *B60K 6/48* (2013.01); *F16H 3/006* (2013.01); *B60K 2006/4825* (2013.01); *F16H 2200/0004* (2013.01); *F16H 2200/0052* (2013.01); *Y02T 10/6221* (2013.01); *Y02T 10/6252* (2013.01); *Y10T 74/19228* (2015.01)

(58) Field of Classification Search
CPC ......... F16H 3/006; F16H 3/087; F16H 3/091; F16H 3/093; F16H 3/16; F16H 2003/0935; F16H 2003/0936; B60W 10/04; B60W 20/10
USPC ...................................... 74/330, 331
See application file for complete search history.

(56) References Cited

U.S. PATENT DOCUMENTS

| | | | |
|---|---|---|---|
| 2009/0272226 A1* | 11/2009 | Remmler et al. | 74/665 L |
| 2010/0154573 A1* | 6/2010 | Jackson et al. | 74/331 |
| 2010/0236344 A1* | 9/2010 | Ross et al. | 74/331 |
| 2010/0257965 A1* | 10/2010 | Rieger et al. | 74/331 |

(Continued)

FOREIGN PATENT DOCUMENTS

| | | |
|---|---|---|
| JP | 11-51126 A | 2/1999 |
| JP | 2005-195115 A | 7/2005 |

(Continued)

*Primary Examiner* — Ha D Ho
*Assistant Examiner* — Thomas Magnuson
(74) *Attorney, Agent, or Firm* — Birch, Stewart, Kolasch & Birch, LLP

(57) ABSTRACT

A first synchronizing sleeve (21) is provided in a second main shaft (5) and a first idling gear (12a) is connected to the second main shaft (5) by the first synchronizing sleeve (21) to transmit a driving force to a first sub-shaft (6) or a second sub-shaft (7) or a second synchronizing sleeve (22) is provided in the second sub-shaft (7) to transmit the driving force to a second idling gear (11b) or a third idling gear (13c) and the driving forces respectively transmitted thereto and shifted are output to a differential gear (110) by a first fixed gear (14a) fixedly provided in the second sub-shaft (7).

12 Claims, 8 Drawing Sheets

(56) References Cited

U.S. PATENT DOCUMENTS

2010/0294060 A1* 11/2010 Gumpoltsberger et al. .... 74/331
2011/0036186 A1* 2/2011 Gumpoltsberger et al. .... 74/331
2011/0088509 A1* 4/2011 Mohlin et al. .............. 74/665 E

FOREIGN PATENT DOCUMENTS

| JP | 2010-117007 A | 5/2010 |
| JP | 2010-203605 A | 9/2010 |
| WO | 2013/087944 A1 | 6/2013 |

* cited by examiner

| GEAR POSITION | K1 | K2 | A | B | C | D | E | F |
|---|---|---|---|---|---|---|---|---|
| REVERSE | ● | | | ● | | ● | | ● |
| FIRST GEAR | ● | | | ● | | ● | ● | |
| SECOND GEAR | | ● | ▽ | ● | | △ | ● | |
| THIRD GEAR | ● | | ● | △ | | ▽ | ● | |
| FOURTH GEAR | | ● | ● | | ▽ | ● | △ | |
| FIFTH GEAR | ● | | △ | | ● | ● | ▽ | |
| SIXTH GEAR | | ● | | | ● | ● | ● | |

TRANSMISSION

TECHNICAL FIELD

The present invention relates to a mechanical automatic transmission.

BACKGROUND ART

As a transmission of a vehicle, a mechanical automatic transmission in which a torque converter is not used is known. In the mechanical automatic transmission, operation (select and shift) of a gearbox and disconnection and connection of a clutch in a manual transmission are actuated by an actuator to enable automatic gear shifting that does not require a torque converter. In the transmission, for example, as described in Patent Literature 1, a gear group fixedly provided in first and second sub-input shafts coaxial with a main input shaft and a gear group supported by first and second output shafts and connected to the first and second output shafts by first and second meshing synchronization devices are meshed with each other, and first sub-shaft first and second gears supported by a first sub-shaft and connectable to each other by a third meshing coupling mechanism are respectively meshed with two gears of the first output shaft to establish at least forward six positions of gear positions and reduce an axial-direction dimension of the transmission.

CITATION LIST

Patent Literature

Patent Literature 1: Japanese Patent Laid-Open No. 2010-203605

SUMMARY OF INVENTION

Technical Problem

In the transmission of Patent Literature 1, a first final gear (output gear) fixedly provided in the first output shaft or a second final gear fixedly provided in the second output shaft and a final driven gear of a differential gear mesh with each other to perform output of power from the transmission.

However, it is not preferable to include a plurality of output shafts and a plurality of final gears because the total length of the transmission increases, leading to deterioration in mountability on a vehicle and increases in weight and costs of the transmission involved in an increase in the number of components. Further, this is not preferable because, in order to output power shifted in the respective gear positions, the first and second final gears need to be disposed such that the final gears mesh with the final driven gear of the differential gear, leading to deterioration in mountability on a vehicle.

The present invention has been devised to solve such problems and it is an object of the present invention to provide a light and inexpensive transmission with high vehicle mountability.

Solution to Problem

In order to attain the object, a transmission according to the present invention includes: a main input shaft to which a driving force from an internal combustion engine is input; a first main shaft to which the driving force of the main input shaft is selectively transmitted via a first clutch; a second main shaft arranged coaxially with the first main shaft, the driving force of the main input shaft being selectively transmitted to the second main shaft via a second clutch; a first sub-shaft and a second sub-shaft arranged in parallel to the first main shaft and the second main shaft; a first idling gear connected to the second main shaft by a first synchronization mechanism relatively rotatably supported by the second main shaft, the first idling gear being capable of transmitting the driving force to the first sub-shaft and the second sub-shaft; a second synchronization mechanism configured to switch transmission of the driving force from the first main shaft with respect to the second sub-shaft; a first fixed gear fixedly provided in the second sub-shaft and configured to output the driving force; a second fixed gear fixedly provided in the first main shaft; and a third fixed gear fixedly provided in the first sub-shaft and configured to mesh with the second fixed gear, wherein the second fixed gear, the third fixed gear, and the second synchronization mechanism are arranged to overlap one another when viewed from a direction perpendicular to the second main shaft (Claim 1).

It is preferable that the second synchronization mechanism switches transmission of the driving force from the first main shaft and the second main shaft with respect to the second sub-shaft (Claim 2).

It is preferable that the second synchronization mechanism transmits, to the second sub-shaft, the driving force of a second idling gear provided in the second sub-shaft, in which the first fixed gear configured to output the driving force is provided, relatively rotatably supported by the second sub-shaft, and configured to transmit the driving force of the first main shaft (Claim 3).

It is preferable that the second synchronization mechanism transmits, to the second sub-shaft, the driving force of a third idling gear provided in the second sub-shaft, in which the first fixed gear configured to output the driving force is provided, relatively rotatably supported by the second sub-shaft, and configured to transmit the driving force of a second idling gear, which transmits the driving force of the first main shaft, or the second main shaft (Claim 4).

It is preferable that the transmission includes an electric motor configured to generate a driving force, and the electric motor is capable of transmitting the driving force to a fourth fixed gear fixedly provided in the first main shaft and configured to mesh with the second idling gear (Claim 5).

It is preferable that the transmission includes an electric motor configured to generate a driving force, and the electric motor is capable of transmitting the driving force to the third idling gear (Claim 6).

It is preferable that the respective gears are provided such that the driving force input to the first main shaft is transmitted to the gears in odd number positions and the driving force input to the second main shaft is transmitted to the gears in even number positions (Claim 7).

Further, it is preferable that the transmission includes: a fourth idling gear relatively rotatably supported by the first sub-shaft, connected to the first sub-shaft by a third synchronization mechanism, and configured to mesh with the first idling gear and transmit the driving force of the first main shaft; and a fifth idling gear relatively rotatably supported by the second sub-shaft, connected to the second sub-shaft by a fourth synchronization mechanism, and configured to mesh with the first idling gear and transmit the driving force of the second main shaft, and the first synchronization mechanism, the third synchronization mechanism, and the fourth synchronization mechanism are arranged to overlap one another when viewed from the direction perpendicular to the second main shaft (Claim 8).

Advantageous Effects of Invention

With the transmission according to the present invention, the first synchronization mechanism is provided in the second main shaft and the first idling gear is connected to the second main shaft by the first synchronization mechanism to make it possible to transmit the driving force to the first sub-shaft or the second sub-shaft. The transmission includes the second synchronization mechanism configured to switch the transmission of the driving force from the first main shaft with respect to the second sub-shaft. By switching the first synchronization mechanism and the second synchronization mechanism, it is possible to transmit power from the main input shaft to the second sub-shaft through a plurality of routes selectively using the first main shaft and the first sub-shaft. Since it is possible to transmit the power from the main input shaft to the second sub-shaft through the plurality of routes in this way, it is possible to set an output gear, which outputs the driving force to a differential gear, to only one gear, i.e., the first fixed gear provided in the second sub-shaft while securing gear ratios in a plurality of gear positions according to combinations of the gears provided in the respective shafts.

Therefore, since the output gear can be set to only the first fixed gear, it is possible to reduce the weight and reduce the costs.

The output gear is set to only the first fixed gear and a meshing position of the differential gear and the gear depends on only the first fixed gear. Therefore, it is possible to increase a degree of freedom of an arrangement of the transmission with respect to the differential gear and improve vehicle mountability.

Further, the second fixed gear fixedly provided in the first main shaft, the third fixed gear fixedly provided in the first sub-shaft and configured to mesh with the second fixed gear, and the second synchronization mechanism are respectively arranged to overlap one another when viewed from the direction perpendicular to the second main shaft. Therefore, it is possible to reduce the length in the axial direction of the transmission and further improve the vehicle mountability (Claim 1).

The transmission includes the second synchronization mechanism configured to switch the transmission of the driving force from the first main shaft and the second main shaft with respect to the second sub-shaft. By switching the first synchronization mechanism and the second synchronization mechanism, it is possible to transmit power from the main input shaft to the second sub-shaft through a plurality of routes selectively using the first main shaft, the second main shaft, and the first sub-shaft. Since it is possible to transmit power from the main input shaft to the second sub-shaft through the plurality of routes in this way, it is possible to set an output gear, which outputs the driving force to a differential gear, to only one gear, i.e., the first fixed gear provided in the second sub-shaft while securing gear ratios in a plurality of gear positions according to combinations of the gears provided in the respective shafts.

Therefore, since the output gear can be set to only the first fixed gear, it is possible to reduce the weight and reduce the costs (Claim 2).

The second synchronization mechanism is provided in the second sub-shaft in which the first fixed gear configured to output the driving force is provided. The driving force of the second idling gear relatively rotatably supported by the second sub-shaft and configured to transmit the driving force of the first main shaft is transmitted to the second sub-shaft. Since the second synchronization mechanism can be compactly set in the second sub-shaft, it is possible to reduce the weight and reduce the costs of the transmission (Claim 3).

The second synchronization mechanism is provided in the second sub-shaft in which the first fixed gear configured to output the driving force is provided. The driving force of the second idling gear, relatively rotatably supported by the second sub-shaft and configured to transmit the driving force of the first main shaft or the third idling gear configured to transmit the driving force of the second main shaft is transmitted to the second sub-shaft. Since the second synchronization mechanism can be compactly set in the second sub-shaft, it is possible to reduce the weight and reduce the costs of the transmission (Claim 4).

It is possible to transmit the driving force to the fourth fixed gear fixedly provided in the first main shaft and configured to mesh with the second idling gear. Therefore, it is possible to supplement the driving force with the electric motor and reduce the fuel consumption of the internal combustion engine (Claim 5).

It is possible to transmit the driving force from the electric motor to the third idling gear. Therefore, it is possible to supplement the driving force with the electric motor and reduce the fuel consumption of the internal combustion engine (Claim 6).

The respective gears are provided such that the driving force input to the second main shaft is transmitted to the gears in the even number positions. The driving force of the electric motor is transmitted to the third idling gear configured to transmit the driving force of the second main shaft. Therefore, it is possible to supplement the driving force with the electric motor in a larger number of gear positions according to the actuation of the second synchronization mechanism. Further, it is possible to reduce the fuel consumption of the internal combustion engine (Claim 7).

The first synchronization mechanism provided in the second main shaft, the third synchronization mechanism provided in the first sub-shaft, and the fourth synchronization mechanism provided in the second sub-shaft are arranged to overlap one another when viewed from the direction perpendicular to the second main shaft. Therefore, it is possible to reduce the length in the axial direction of the transmission and further improve the vehicle mountability (Claim 8).

DESCRIPTION OF EMBODIMENTS

Embodiments of the present invention are explained below on the basis of the drawings.

[First Embodiment]

Figure 1:
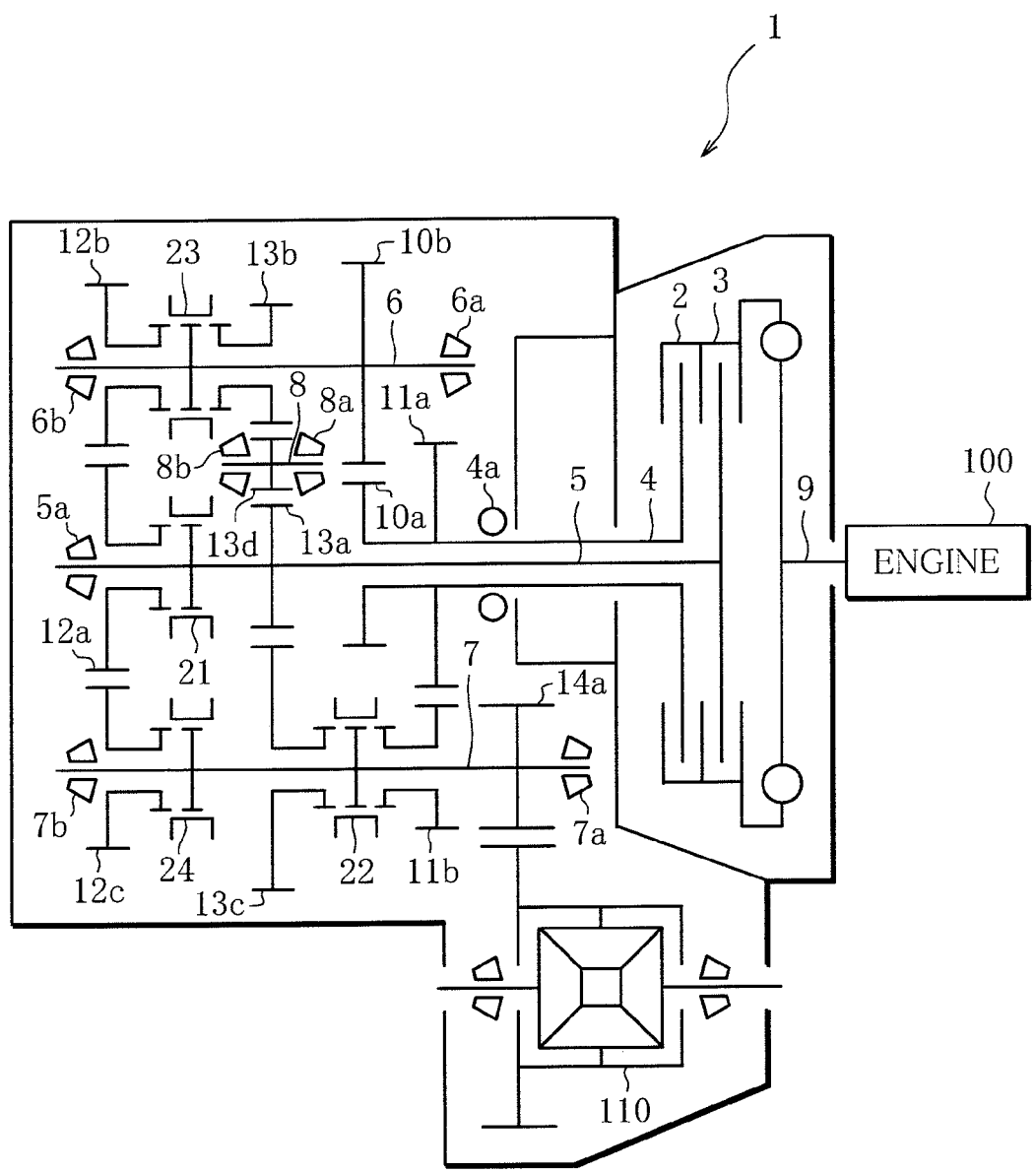
FIG. 1 is a schematic configuration diagram of a transmission according to a first embodiment of the present invention.
Figure 2:
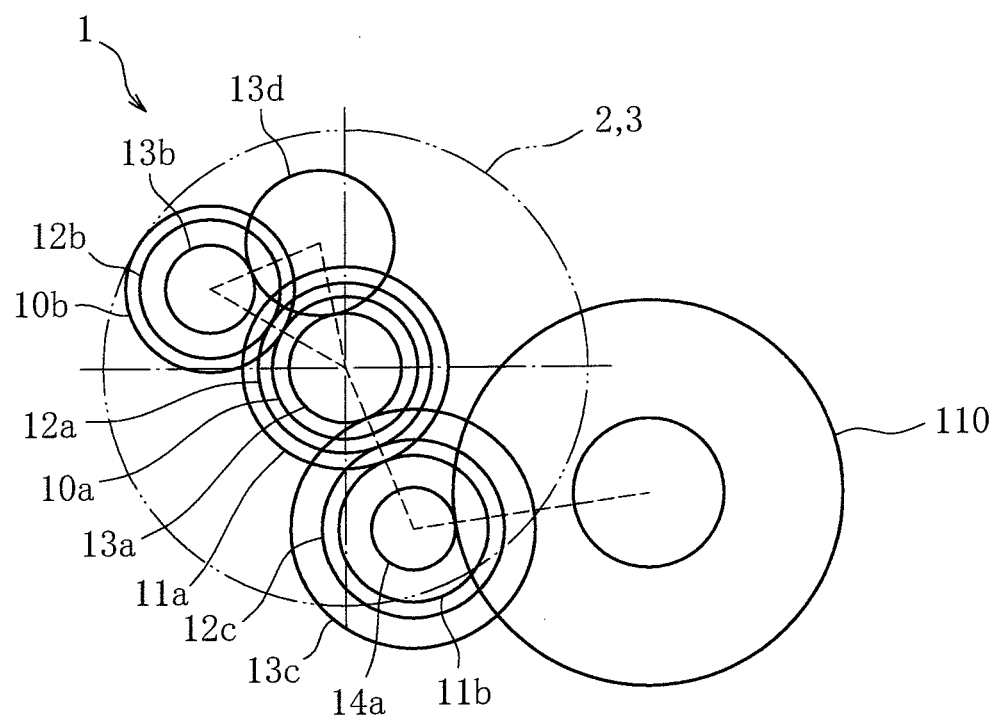
FIG. 2 is an axial direction view showing positional relations among respective shafts of the transmission according to the first embodiment of the present invention.

FIG. 1 is a schematic configuration diagram of a transmission according to a first embodiment of the present invention. FIG. 2 is an axial direction view showing a positional relation among respective shafts of the transmission according to the first embodiment. The configuration of the transmission according to the first embodiment of the present invention is explained below.

As shown in FIGS. 1 and 2, a gearbox unit 1 includes two clutches 2 and 3, two main shafts 4 and 5 arranged coaxially, and three sub-shafts 6, 7, and 8. The first main shaft 4 is configured such that power is transmitted from an output shaft (a main input shaft) 9 of an engine (an internal combustion engine) 100 to the first main shaft 4 via the first clutch 2. The second main shaft 5 is configured such that power is transmitted from the output shaft 9 to the second main shaft 5 via the second clutch 3. The first main shaft 4 and the second main shaft 5 are rotatably supported by bearings 4a and 5a.

The first sub-shaft 6, the second sub-shaft 7, and the third sub-shaft 8 are arranged apart from one another such that the axes thereof are parallel to the axes of the first main shaft 4 and the second main shaft 5. The second sub-shaft 7 is configured to be capable of transmitting power to a differential gear 110 in a later gear position of the gearbox unit 1 via a first fixed gear 14a described later. The first sub-shaft 6 is rotatably supported by bearings 6a and 6b. The second sub-shaft 7 is rotatably supported by bearings 7a and 7b. The third sub-shaft 8 is rotatably supported by bearings 8a and 8b.

A second fixed gear 10a and a fourth fixed gear 11a are fixed to the first main shaft 4 in order from the opposite side of the output shaft 9 to integrally rotate with the first main shaft 4. In the second main shaft 5, a first idling gear 12a and a fifth fixed gear 13a are provided in order from the opposite side of the output shaft 9. The first idling gear 12a is pivotally supported to be relatively rotatable with respect to the second main shaft 5. The fifth fixed gear 13a is fixed to integrally rotate with the second main shaft 5.

In the first sub-shaft 6, a fourth idling gear 12b, a sixth idling gear 13b, and a third fixed gear 10b are provided in order from the opposite side of the output shaft 9. The fourth idling gear 12b and the sixth idling gear 13b are pivotally supported relatively rotatably with respect to the first sub-shaft 6. The third fixed gear 10b is fixed to integrally rotate with the first sub-shaft 6.

In the second sub-shaft 7, a fifth idling gear 12c, a third idling gear 13c, a second idling gear 11b, and the first fixed gear 14a are provided in order from the opposite side of the output shaft 9. The fifth idling gear 12c, the third idling gear 13c, and the second idling gear 11b are pivotally supported relatively rotatably with respect to the second sub-shaft 7. The first fixed gear 14a is fixed to integrally rotate with the second sub-shaft 7. A sixth fixed gear 13d is fixed to the third sub-shaft 8 to integrally rotate with the third sub-shaft 8.

With such a gear arrangement, the second fixed gear 10a and the third fixed gear 10b, the fourth fixed gear 11a and the second idling gear 11b, the first idling gear 12a, the fourth idling gear 12b, and the fifth idling gear 12c, the fifth fixed gear 13a and the third idling gear 13c, the fifth fixed gear 13a and the sixth fixed gear 13d, and the sixth idling gear 13b and the sixth fixed gear 13d are disposed to respectively always mesh with each other.

In the gearbox unit 1, a first synchronizing sleeve (a first synchronization mechanism) 21, a second synchronizing sleeve (a second synchronization mechanism) 22, a third synchronizing sleeve (a third synchronization mechanism) 23, and a fourth synchronizing sleeve (a fourth synchronization mechanism) 24 are provided. The respective synchronizing sleeves 21, 22, 23, and 24 are slid along the axes of main shafts or subs-shafts, which respectively pivotally supports the synchronizing sleeves 21, 22, 23, and 24, by a not-shown shift fork.

Among the synchronizing sleeves, the first synchronizing sleeve 21 is set between the first idling gear 12a and the fifth fixed gear 13a to be slidable along the axis of the second main shaft 5 and is slid by the not-shown shift fork. The second synchronizing sleeve 22 is set between the second idling gear 11b and the third idling gear 13c to be slidable along the axis of the second sub-shaft 7 and is slid by the shift fork. The third synchronizing sleeve 23 is set between the fourth idling gear 12b and the sixth idling gear 13b to be slidable along the axis of the first sub-shaft 6 and is slid by the shift fork. The fourth synchronizing sleeve 24 is set between the fifth idling gear 12c and the third idling gear 13c to be slidable along the axis of the second sub-shaft 7 and is slid respectively by the shift fork.

The first synchronizing sleeve 21, the third synchronizing sleeve 23, and the fourth synchronizing sleeve 24 are disposed on the same plane perpendicular to the axial direction of the respective shafts. That is, the first synchronizing sleeve 21, the third synchronizing sleeve 23, and the fourth synchronizing sleeve 24 are arranged to overlap one another when viewed from the direction perpendicular to the axial direction of the respective shafts and arranged to lie one on top of another when viewed from the direction perpendicular to the axial direction of the respective shafts.

The second synchronizing sleeve 22 is disposed on the same plane perpendicular to the axial direction of the respective shafts as the second fixed gear 10a and the third fixed gear 10b. That is, the second synchronizing sleeve 22 is arranged to overlap the second fixed gear 10a and the third fixed gear 10b when viewed from the direction perpendicular to the axial direction of the respective shafts and lie on the second fixed gear 10a and the third fixed gear 10b when viewed from the direction perpendicular to the axial direction of the respective shafts.

By sliding each of the synchronizing sleeves 21, 22, 23, and 24, it is possible to disconnect and connect (shift), with the first synchronizing sleeve 21, the first idling gear 12a from and to the second main shaft 5. It is possible to selectively disconnect and connect (shift), with the second synchronizing sleeve 22, each of the second idling gear 11b and the third idling gear 13c from and to the second sub-shaft 7. It is possible to selectively disconnect and connect (shift), with the third synchronizing sleeve 23, each of the fourth idling gear 12b and the sixth idling gear 13b from and to the first sub-shaft 6. Further, it is possible to disconnect and connect (shift), with the fourth synchronizing sleeve 24, the fifth idling gear 12c from and to the second sub-shaft 7.

That is, the gearbox unit 1 of a dual-clutch type transmission is configured to be capable of selectively switching the gear positions to the reverse, the first gear, the second gear, the third gear, the fourth gear, the fifth gear, and the sixth gear by sliding each of the synchronizing sleeves 21, 22, 23, and 24 and disconnecting and connecting the clutches 2 and 3.

Next, gearbox operation of the dual-clutch type transmission applied with the transmission of the present invention is explained with reference to FIG. 3 and FIGS. 4A to 4G.

Figures 3, 4A:
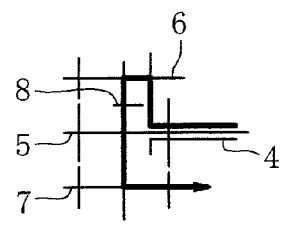
FIG. 3 is a diagram showing the actuations of clutches and synchronizing sleeves in respective gear positions of the transmission according to the first embodiment of the present invention.
FIG. 4A is a diagram showing transmission order of a driving force in a reverse of the transmission according to the first embodiment of the present invention.
Figure 4B:
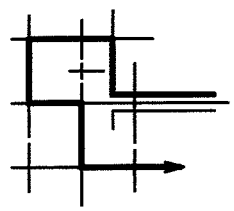
FIG. 4B is a diagram showing transmission order of the driving force in a first gear of the transmission according to the first embodiment of the present invention.
Figure 4C:
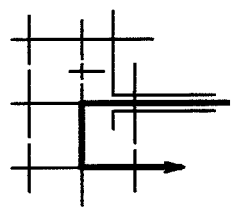
FIG. 4C is a diagram showing transmission order of the driving force in a second gear of the transmission according to the first embodiment of the present invention.
Figure 4D:
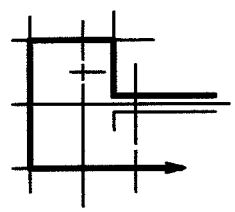
FIG. 4D is a diagram showing transmission order of the driving force in a third gear of the transmission according to the first embodiment of the present invention.
Figure 4E:
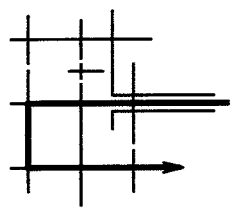
FIG. 4E is a diagram showing transmission order of the driving force in a fourth gear of the transmission according to the first embodiment of the present invention.
Figure 4F:
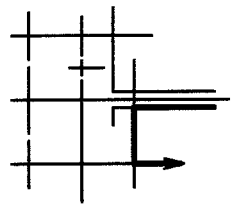
FIG. 4F is a diagram showing transmission order of the driving force in a fifth gear of the transmission according to the first embodiment of the present invention.
Figure 4G:
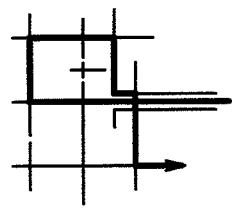
FIG. 4G is a diagram showing transmission order of the driving force in a sixth gear of the transmission according to the first embodiment of the present invention.

FIG. 3 is a diagram showing the actuations of the clutches and the synchronizing sleeves in the respective gear positions. FIG. 4A is a diagram showing transmission order of a driving force in the reverse. FIG. 4B is a diagram showing transmission order of the driving force in the first gear. FIG. 4C is a diagram showing transmission order of the driving force in the second gear. FIG. 4D is a diagram showing transmission order of the driving force in the third gear. FIG. 4E is a diagram showing transmission order of the driving force in the fourth gear. FIG. 4F is a diagram showing transmission order of the driving force in the fifth gear. FIG. 4G is a diagram showing transmission order of the driving force in the sixth gear. In FIG. 3, black circles indicate the actuation of the synchronizing sleeves, white void downward triangles indicate the actuation of the synchronizing sleeves only during shift-up, and white void upward triangles indicate the actuation of the synchronizing sleeves only during shift-down. In FIG. 3, K1 indicates disconnection and connection of the first clutch 2 and K2 indicates disconnection and connection of the second clutch 3. In FIG. 3, A indicates disconnection and connection of the fifth idling gear 12c and the second sub-shaft 7 by the actuation of the fourth synchronizing sleeve 24, B indicates disconnection and connection of the third idling gear 13c and the second sub-shaft 7 by the actuation of the second synchronizing sleeve 22, C indicates disconnection and connection of the second idling gear 11b and the second sub-shaft 7 by the actuation of the second synchronizing sleeve 22, D indicates disconnection and connection of the first idling gear 12a and the second main shaft 5 by the actuation of the first synchronizing sleeve 21, E indicates disconnection and connection of the fourth idling gear 12b and the first sub-shaft 6 by the actuation of the third synchronizing sleeve 23, and F indicates disconnection and connection of the sixth idling gear 13b and the first sub-shaft 6 by the actuation of the third synchronizing sleeve 23. Thick solid lines in FIGS. 4A to 4G indicate transmission routes of the driving force.

In the reverse in FIG. 4A, as shown in FIG. 3, the first clutch 2 is connected (K1), the second synchronizing sleeve 22 is actuated to connect the third idling gear 13c and the second sub-shaft 7 (B), the first synchronizing sleeve 21 is actuated to connect the first idling gear 12a and the second main shaft 5 (D), and the third synchronizing sleeve 23 is actuated to connect the sixth idling gear 13b and the first sub-shaft 6 (F). Consequently, as an output of the engine 100, a driving force in a rotating direction reversed with respect to an advancing direction is output froth the first fixed gear 14a via the first main shaft 4, the second fixed gear 10a, the third fixed gear 10b, the first sub-shaft 6, the sixth idling gear 13b, the sixth fixed gear 13d, the fifth fixed gear 13a, the third idling gear 13c, and the second sub-shaft 7.

In the first gear in FIG. 4B, as shown in FIG. 3, the first clutch 2 is connected (K1), the second synchronizing sleeve 22 is actuated to connect the third idling gear 13c and the second sub-shaft 7 (B), the first synchronizing sleeve 21 is actuated to connect the first idling gear 12a and the second main shaft 5 (D), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the first main shaft 4, the second fixed gear 10a, the third fixed gear 10b, the first sub-shaft 6, the fourth idling gear 12b, the first idling gear 12a, the second main shaft 5, the fifth fixed gear 13a, the third idling gear 13c, and the second sub-shaft 7. Note that, when shift operation is shift-up, the shift-up can be performed by only disconnecting and connecting operation of the first clutch 2 and the second clutch 3.

In the second gear in FIG. 4C, as shown in FIG. 3, the second clutch 3 is connected (K2), the second synchronizing sleeve 22 is actuated to connect the third idling gear 13c and the second sub-shaft 7 (B), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the second main shaft 5, the fifth fixed gear 13a, the third idling gear 13c, and the second sub-shaft 7. Note that, when the shift operation is the shift-up, the fourth synchronizing sleeve 24 is actuated to connect the fifth idling gear 12c and the second sub-shaft 7 in advance (A) and, when the shift operation is shift-down, the first synchronizing sleeve 21 is actuated to connect the first idling gear 12a and the second main shaft 5 in advance (D). Consequently, it is possible to perform pre-shift for enabling the shift-up or the shift-down only with the disconnection and connection operation of the first clutch 2 and the second clutch 3.

In the third gear in FIG. 4D, as shown in FIG. 3, the first clutch 2 is connected (K1), the fourth synchronizing sleeve 24 is actuated to connect the fifth idling gear 12c and the second sub-shaft 7 (A), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the first main shaft 4, the second fixed gear 10a, the third fixed gear 10b, the first sub-shaft 6, the fourth idling gear 12b, the first idling gear 12a, the fifth idling gear 12c, and the second sub-shaft 7. Note that, when the shift operation is the shift-up, the first synchronizing sleeve 21 is actuated to connect the first idling gear 12a and the second main shaft 5 in advance (D) or, when the shift operation is the shift-down, the second synchronizing sleeve 22 is actuated to connect the third idling gear 13c and the second sub-shaft 7 in advance (B). Consequently, it is possible to perform the pre-shift for enabling the shift-up or the shift-down only with the disconnection and connection operation of the first clutch 2 and the second clutch 3.

In the fourth gear in FIG. 4E, as shown in FIG. 3, the second clutch 3 is connected (K2), the fourth synchronizing sleeve 24 is actuated to connect the fifth idling gear 12c and the second sub-shaft 7 (A), and the first synchronizing sleeve 21 is actuated to connect the first idling gear 12a and the second main shaft 5 (D). Consequently, as the output of the engine 100, a driving force in the advancing rotating direction is output from the first fixed gear 14a via the second main shaft 5, the first idling gear 12a, the fifth idling gear 12c, and the second sub-shaft 7. Note that, when the shift operation is the shift-up, the second synchronizing sleeve 22 is actuated to connect the second idling gear 11b and the second sub-shaft 7 in advance (C) or, when the shift operation is the shift-down, the third synchronizing sleeve 23 is actuated to connect the fourth idling gear 12b and the first sub-shaft 6 in advance (E). Consequently, it is possible to perform the pre-shift for enabling the shift-up or the shift-down only with the disconnection and connection operation of the first clutch 2 and the second clutch 3.

In the fifth gear in FIG. 4F, as shown in FIG. 3, the first clutch 2 is connected (K1), the second synchronizing sleeve 22 is actuated to connect the second idling gear 11b and the second sub-shaft 7 (C), and the first synchronizing sleeve 21 is actuated to connect the first idling gear 12a and the second main shaft 5 (D). Consequently, as the output of the engine 100, a driving force in the advancing rotating direction is output from the first fixed gear 14a via the first main shaft 4, the fourth fixed gear 11a, the second idling gear 11b, and the second sub-shaft 7. Note that, when the shift operation is the shift-up, the third synchronizing sleeve 23 is actuated to connect the fourth idling gear 12b and the first sub-shaft 6 in advance (E) or, when the shift operation is the shift-down, the fourth synchronizing sleeve is actuated to connect the fifth idling gear 12c and the second sub-shaft 7 in advance (A). Consequently, it is possible to perform the pre-shift for enabling the shift-up or the shift-down only with the disconnection and connection operation of the first clutch 2 and the second clutch 3.

In the sixth gear in FIG. 4G, as shown in FIG. 3, the second clutch 3 is connected (K2), the second synchronizing sleeve 22 is actuated to connect the second idling gear 11b and the second sub-shaft 7 (C), the first synchronizing sleeve 21 is actuated to connect the first idling gear 12a and the second main shaft 5 (D), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the second main shaft 5, the first idling gear 12a, the fourth idling gear 12b, the first sub-shaft 6, the third fixed gear 10b, the second fixed gear 10a, the first main shaft 4, the fourth fixed gear 11a, the second idling gear 11b, and the second sub-shaft 7. Note that, when the shift operation is the shift-down, it is possible to perform the shift-down only with the disconnection and connection operation of the first clutch 2 and the second clutch 3.

In this way, in the transmission according to the first embodiment of the present invention, the first synchronizing sleeve 21 is provided in the second main shaft 5 and the first idling gear 12a is connected to the second main shaft 5 by the first synchronizing sleeve 21 to make it possible to transmit the driving force to the first sub-shaft 6 or the second sub-shaft 7. The second synchronizing sleeve 22 is provided in the second sub-shaft 7 to make it possible to selectively transmit the driving force from the first main shaft 4 and the second main shaft 5 to the second sub-shaft 7 via the second idling gear 11b or the third idling gear 13c. The driving force transmitted to the second sub-shaft 7 and shifted is output to the differential gear 110 from the first fixed gear 14a fixedly provided in the second sub-shaft 7. Further, the power can be transmitted between the first sub-shaft 6 and the second sub-shaft 7 via the first idling gear 12a.

Therefore, by subjecting the first synchronizing sleeve 21 and the second synchronizing sleeve 22 and the first clutch 2 and the second clutch 3 as explained above to the actuation control, it is possible to finally set a plurality of routes, which pass through the second sub-shaft 7, selectively using the first main shaft 4, the second main shaft 5, and the first sub-shaft 6. Further, by subjecting the third synchronizing sleeve 23 provided in the first sub-shaft 6 and the fourth synchronizing sleeve 24 provided in the second sub-shaft 7 to the actuation control as well, it is possible to secure gear ratios in the respective gear positions according to combinations of the shift gears provided in the three sub-shafts 6, 7, and 8 and the two main shafts 4 and 5.

In all the gear positions, it is possible to set a gear, which outputs the driving force to the differential gear 110, to only one gear, i.e., the first fixed gear 14a provided in the second sub-shaft 7. Therefore, it is possible to reduce the weight and reduce the costs.

The output gear is set to only the first fixed gear 14a and meshing of the differential gear 110 and the gear depends on only the first fixed gear 14a. Therefore, as shown in FIG. 2, it is possible to increase a degree of freedom of an arrangement of the gearbox unit 1 with respect to the differential gear 110 and improve vehicle mountability.

The second fixed gear 10a fixedly provided in the first main shaft 4, the third fixed gear 10b fixedly provided in the first sub-shaft 6 and configured to mesh with the second fixed gear 10a, and the second synchronizing sleeve 22 are disposed on the same plane perpendicular to the axial direction of the respective shafts. Therefore, since the length in the axial direction of the gearbox unit 1 can be reduced, it is possible to further improve the vehicle mountability.

The first synchronizing sleeve 21, the third synchronizing sleeve 23, and the fourth synchronizing sleeve 24 are arranged in parallel on the same plane perpendicular to the axial direction of the respective shafts. Therefore, since the length in the axial direction of the gearbox unit 1 can be further reduced, it is possible to further improve the vehicle mountability.

[Second Embodiment]

A transmission according to a second embodiment of the present invention is explained below.

In the second embodiment, as opposed to the first embodiment, a motor (an electric motor) 31 configured to supplement the driving force of the engine 100 is added to a gearbox unit 1' and gears and sub-shafts are added according to the addition of the motor 31. Differences from the first embodiment are explained below.

Figure 5:
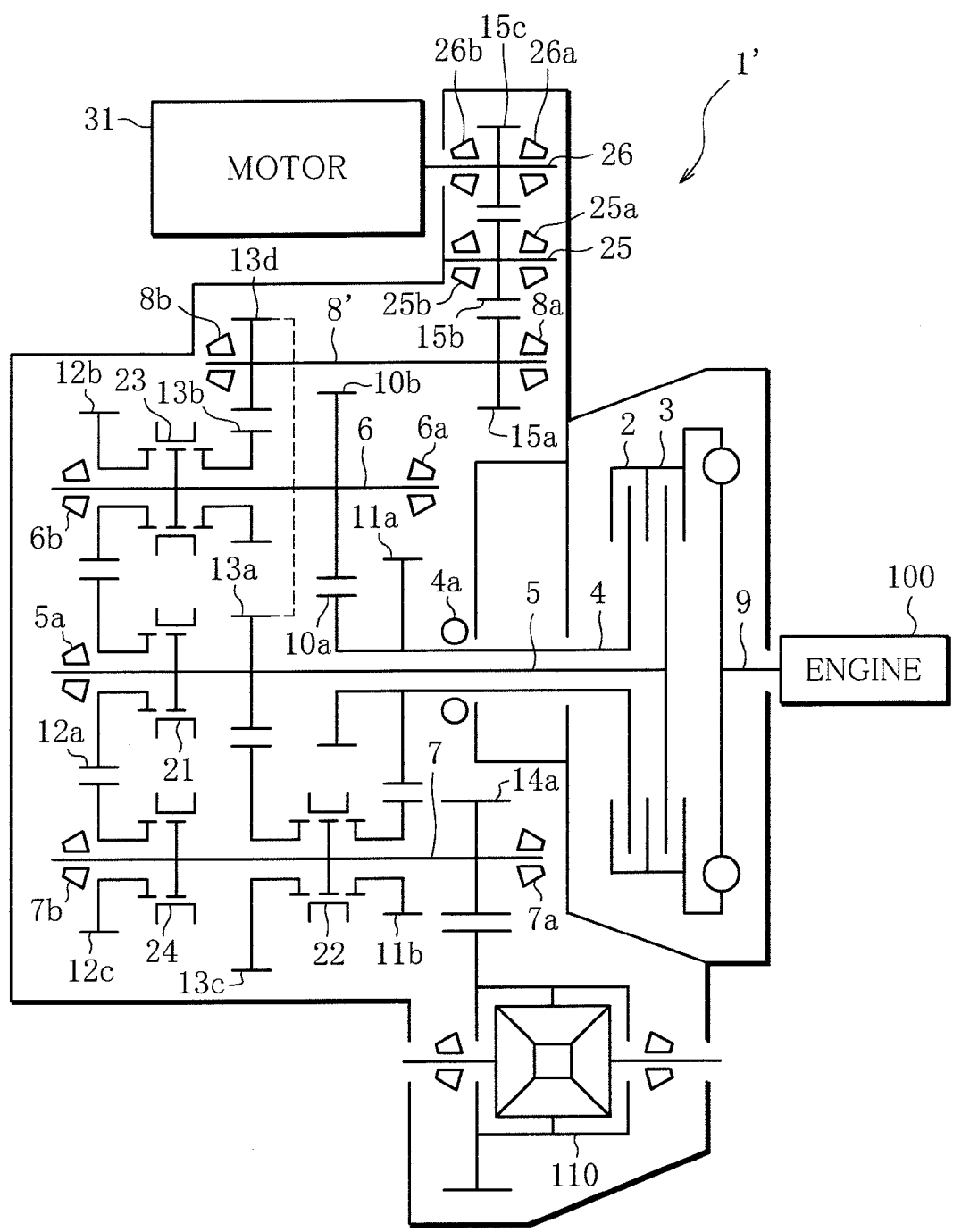
FIG. 5 is a schematic configuration diagram of a transmission according to a second embodiment of the present invention.
Figure 6:
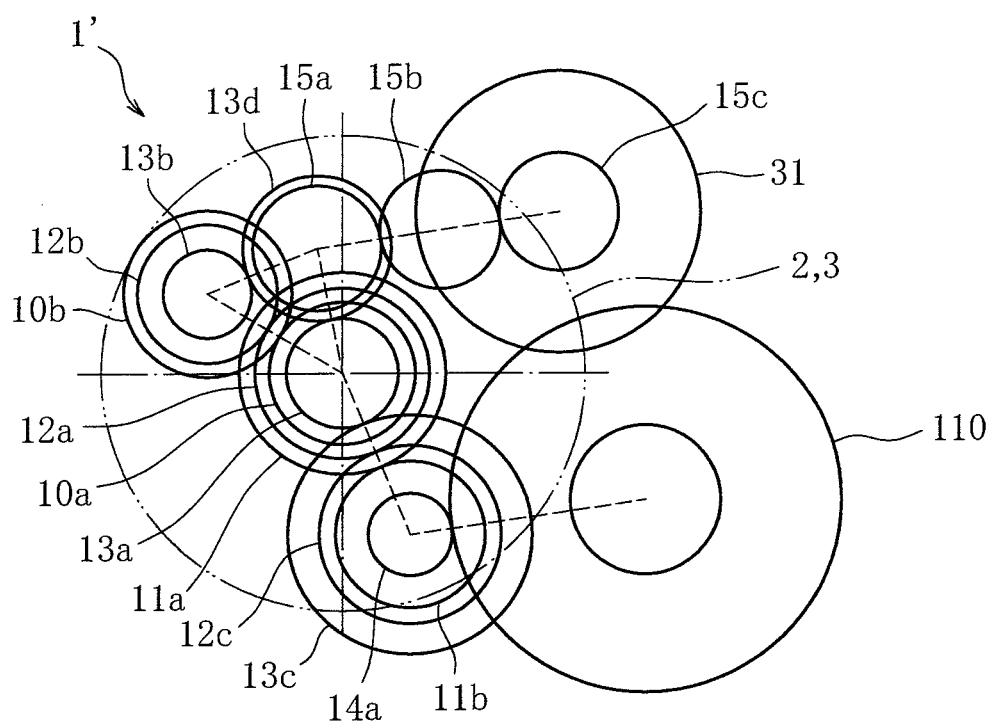
FIG. 6 is an axial direction view showing a positional relation among respective shafts of the transmission according to the second embodiment of the present invention.

FIG. 5 is a schematic configuration diagram of the transmission according to the second embodiment of the present invention. FIG. 6 is an axial direction view showing a positional relation of respective shafts of the transmission according to the second embodiment of the present invention.

As shown in FIGS. 5 and 6, in the gearbox unit 1', the length of a third sub-shaft 8' is set large with respect to that in the first embodiment. The gearbox unit 1' further includes two sub-shafts 25 and 26. The fourth sub-shaft 25 and the fifth sub-shaft 26 are arranged apart from each other such that the axes thereof are parallel to the axes of the first main shaft 4 and the second main shaft 5 like the other sub-shafts. An output shaft of the motor 31 provided in the gearbox unit 1' is connected to an end of the fifth sub-shaft 26. The third sub-shaft 8', the fourth sub-shaft 25, and the fifth sub-shaft 26 are configured to be capable of transmitting power generated by the motor 31 to the differential gear 110. The fourth sub-shaft 25 is rotatably supported by bearings 25a and 25b. The fifth sub-shaft 26 is rotatably supported by bearings 26a and 26b.

In the third sub-shaft 8', the sixth fixed gear 13d and a seventh fixed gear 15a are fixed in order from the opposite side of the output shaft 9 to integrally rotate with the third sub-shaft 8'. An eighth fixed gear 15b is fixed to the fourth sub-shaft 25 to integrally rotate with the fourth sub-shaft 25. A ninth fixed gear 15c is fixed to the fifth sub-shaft 26 to integrally rotate with the fifth sub-shaft 26.

With such a gear arrangement, the respective gears are disposed such that the seventh fixed gear 15a and the eighth fixed gear 15b and the eighth fixed gear 15b and the ninth fixed gear 15c always respectively mesh with each other.

In this way, in the transmission according to the second embodiment of the present invention, the motor 31 is provided in the gearbox unit 1' and the driving force from the motor 31 is transmitted to the third idling gear 13c via the seventh fixed gear 15a, the eighth fixed gear 15b, and the ninth fixed gear 15c. Therefore, it is possible to supplement the driving force with the motor 31 in a larger number of gear positions (specifically, low gear positions of the first gear, the second gear, the third gear, and the reverse) according to the actuation of the second synchronizing sleeve 22. Further, it is possible to reduce the fuel consumption of the engine 100.

[Third Embodiment]

A transmission according to a third embodiment of the present invention is explained below.

In the third embodiment, as opposed to the first embodiment, the motor 31 configured to supplement the driving force of the engine 100 is added to a gearbox unit 1" and gears and sub-shafts are added according to the addition of the motor 31. A transmission method for a driving force of the motor 31 is different from the transmission method in the second embodiment. Differences from the first embodiment are explained below.

Figure 7:
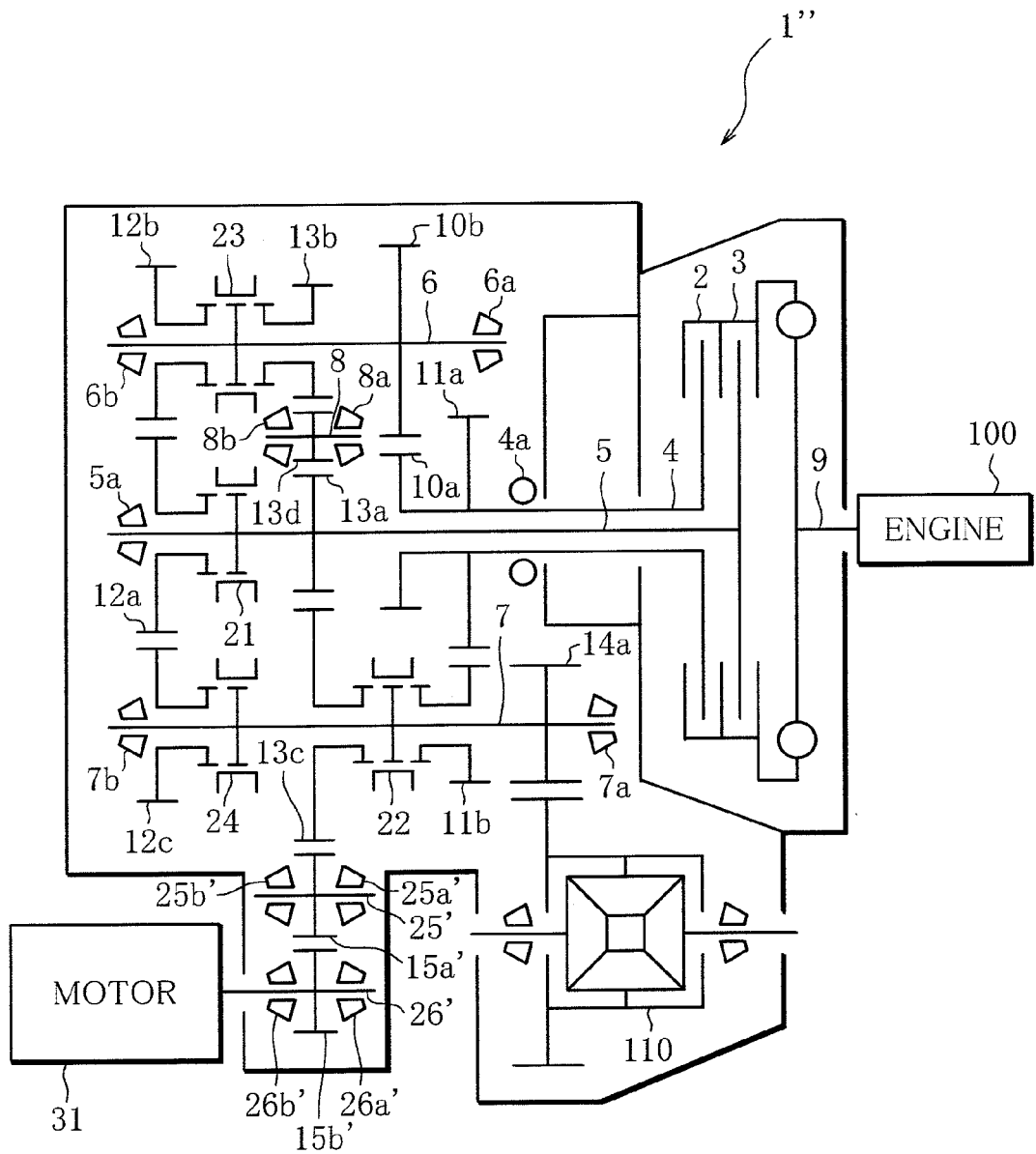
FIG. 7 is a schematic configuration diagram of a transmission according to a third embodiment of the present invention.

FIG. 7 is a schematic configuration diagram of the transmission according to the third embodiment of the present invention.

As shown in FIG. 7, the gearbox unit 1" includes two sub-shafts 25' and 26'. The fourth sub-shaft 25' and the fifth sub-shaft 26' are arranged apart from each other such that the axes thereof are parallel to the axes of the first main shaft 4 and the second main shaft 5 like the other sub-shafts. The output shaft of the motor 31 provided in the gearbox unit 1" is connected to an end of the fifth sub-shaft 26'. The fourth sub-shaft 25' and the fifth sub-shaft 26' are configured to be capable of transmitting power generated by the motor 31 to the differential gear 110. The fourth sub-shaft 25' is rotatably supported by bearings 25a' and 25b'. The fifth sub-shaft 26' is rotatably supported by bearings 26a' and 26b'.

A seventh fixed gear 15a' is fixed to the fourth sub-shaft 25' to integrally rotate with the fourth sub-shaft 25'. An eighth fixed gear 15b' is fixed to the fifth sub-shaft 26' to integrally rotate with the fifth sub-shaft 26'.

With such a gear arrangement, the respective gears are disposed such that the third idling gear 13c and the seventh fixed gear 15a', and the seventh fixed gear 15a' and the eighth fixed gear 15b' always respectively mesh with each other.

In this way, in the transmission according to the third embodiment of the present invention, the motor 31 is provided in the gearbox unit 1" as in the second embodiment and the driving force from the motor 31 is transmitted to the third idling gear 13c via the seventh fixed gear 15a' and the eighth fixed gear 15b'. Therefore, it is possible to supplement the driving force with the motor 31 in a larger number of gear positions (specifically, low gear positions of the first gear, the second gear, the third gear, and the reverse) according to the actuation of the second synchronizing sleeve 22. Further, it is possible to reduce the fuel consumption of the engine 100.

The embodiments of the present invention are explained above. However, forms of the present invention are not limited to the embodiments.

In the embodiments, the number of gear positions is set to the forward six gear positions. However, the number of gear positions is not limited to this. The present invention can be applied irrespective of whether the number of gear positions is smaller than the forward six gear positions or larger than the forward six gear positions.

REFERENCE SIGNS LIST

1 Gearbox unit
2 First clutch
3 Second clutch
4 First main shaft
5 Second main shaft
6 First sub-shaft
7 Second sub-shaft
9 Output shaft (main input shaft)
10a Second fixed gear
10b Third fixed gear
11b Second idling gear
12a First idling gear
13c Third idling gear
14a First fixed gear
21 First synchronizing sleeve (first synchronization mechanism)
22 Second synchronizing sleeve (second synchronization mechanism)
23 Third synchronizing sleeve (third synchronization mechanism)
24 Fourth synchronizing sleeve (fourth synchronization mechanism)
31 Motor (electric motor)
100 Engine (internal combustion engine)

The invention claimed is:

1. A transmission comprising:
a main input shaft to which a driving force from an internal combustion engine is input;
a first main shaft to which the driving force of the main input shaft is selectively transmitted via a first clutch;
a second main shaft arranged coaxially with the first main shaft, the driving force of the main input shaft being selectively transmitted to the second main shaft via a second clutch;
a first sub-shaft and a second sub-shaft arranged in parallel to the first main shaft and the second main shaft;
a first idling gear connected to the second main shaft by a first synchronization mechanism relatively rotatably supported by the second main shaft, the first idling gear being capable of transmitting the driving force to the first sub-shaft and the second sub-shaft;
a second synchronization mechanism configured to switch transmission of the driving force from the first main shaft with respect to the second sub-shaft;
a first fixed gear fixedly provided in the second sub-shaft and configured to output the driving force;
a second fixed gear fixedly provided in the first main shaft; and
a third fixed gear fixedly provided in the first sub-shaft and configured to mesh with the second fixed gear, wherein
the second fixed gear, the third fixed gear, and the second synchronization mechanism are arranged to overlap one another when viewed from a direction perpendicular to the second main shaft,
the second synchronization mechanism switches transmission of the driving force from the first main shaft and the second main shaft with respect to the second sub-shaft.

2. The transmission according to claim 1, wherein the second synchronization mechanism transmits, to the second sub-shaft, the driving force of a third idling gear provided in the second sub-shaft, in which the first fixed gear configured to output the driving force is provided, relatively rotatably supported by the second sub-shaft, and configured to transmit the driving force of a second idling gear, which transmits the driving force of the first main shaft, or the second main shaft.

3. The transmission according to claim 2, comprising an electric motor configured to generate a driving force, wherein
the electric motor is capable of transmitting the driving force to the third idling gear.

4. The transmission according to claim 1, wherein the respective gears are provided such that the driving force input to the first main shaft is transmitted to the gears in odd number positions and the driving force input to the second main shaft is transmitted to the gears in even number positions.

5. The transmission according to claim 2, wherein the respective gears are provided such that the driving force input to the first main shaft is transmitted to the gears in odd number positions and the driving force input to the second main shaft is transmitted to the gears in even number positions.

6. The transmission according to claim 3, wherein the respective gears are provided such that the driving force input to the first main shaft is transmitted to the gears in odd number positions and the driving force input to the second main shaft is transmitted to the gears in even number positions.

7. The transmission according to claim 1, comprising:
a fourth idling gear relatively rotatably supported by the first sub-shaft, connected to the first sub-shaft by a third synchronization mechanism, and configured to mesh with the first idling gear and transmit the driving force of the first main shaft; and
a fifth idling gear relatively rotatably supported by the second sub-shaft, connected to the second sub-shaft by a fourth synchronization mechanism, and configured to mesh with the first idling gear and transmit the driving force of the second main shaft, wherein
the first synchronization mechanism, the third synchronization mechanism, and the fourth synchronization mechanism are arranged to overlap one another when viewed from the direction perpendicular to the second main shaft.

8. The transmission according to claim 2, comprising:
a fourth idling gear relatively rotatably supported by the first sub-shaft, connected to the first sub-shaft by a third synchronization mechanism, and configured to mesh with the first idling gear and transmit the driving force of the first main shaft; and
a fifth idling gear relatively rotatably supported by the second sub-shaft, connected to the second sub-shaft by a fourth synchronization mechanism, and configured to mesh with the first idling gear and transmit the driving force of the second main shaft, wherein
the first synchronization mechanism, the third synchronization mechanism, and the fourth synchronization mechanism are arranged to overlap one another when viewed from the direction perpendicular to the second main shaft.

9. The transmission according to claim 3, comprising:
a fourth idling gear relatively rotatably supported by the first sub-shaft, connected to the first sub-shaft by a third synchronization mechanism, and configured to mesh with the first idling gear and transmit the driving force of the first main shaft; and
a fifth idling gear relatively rotatably supported by the second sub-shaft, connected to the second sub-shaft by a fourth synchronization mechanism, and configured to mesh with the first idling gear and transmit the driving force of the second main shaft, wherein
the first synchronization mechanism, the third synchronization mechanism, and the fourth synchronization mechanism are arranged to overlap one another when viewed from the direction perpendicular to the second main shaft.

10. The transmission according to claim 4, comprising:
a fourth idling gear relatively rotatably supported by the first sub-shaft, connected to the first sub-shaft by a third synchronization mechanism, and configured to mesh with the first idling gear and transmit the driving force of the first main shaft; and
a fifth idling gear relatively rotatably supported by the second sub-shaft, connected to the second sub-shaft by a fourth synchronization mechanism, and configured to mesh with the first idling gear and transmit the driving force of the second main shaft, wherein
the first synchronization mechanism, the third synchronization mechanism, and the fourth synchronization mechanism are arranged to overlap one another when viewed from the direction perpendicular to the second main shaft.

11. The transmission according to claim 5, comprising:
a fourth idling gear relatively rotatably supported by the first sub-shaft, connected to the first sub-shaft by a third synchronization mechanism, and configured to mesh with the first idling gear and transmit the driving force of the first main shaft; and
a fifth idling gear relatively rotatably supported by the second sub-shaft, connected to the second sub-shaft by a fourth synchronization mechanism, and configured to mesh with the first idling gear and transmit the driving force of the second main shaft, wherein
the first synchronization mechanism, the third synchronization mechanism, and the fourth synchronization mechanism are arranged to overlap one another when viewed from the direction perpendicular to the second main shaft.

12. The transmission according to claim 6, comprising:
a fourth idling gear relatively rotatably supported by the first sub-shaft, connected to the first sub-shaft by a third synchronization mechanism, and configured to mesh with the first idling gear and transmit the driving force of the first main shaft; and
a fifth idling gear relatively rotatably supported by the second sub-shaft, connected to the second sub-shaft by a fourth synchronization mechanism, and configured to mesh with the first idling gear and transmit the driving force of the second main shaft, wherein
the first synchronization mechanism, the third synchronization mechanism, and the fourth synchronization mechanism are arranged to overlap one another when viewed from the direction perpendicular to the second main shaft.

\* \* \* \* \*